United States Patent [19]
Takezawa

[11] Patent Number: 6,093,998
[45] Date of Patent: Jul. 25, 2000

[54] LIQUID-COOLING TYPE CATHODE-RAY TUBE WITH LIGHT SHIELDING MEMBER

[75] Inventor: Hiroyuki Takezawa, Kanagawa, Japan

[73] Assignee: Sony Corporation, Japan

[21] Appl. No.: 08/972,949

[22] Filed: Nov. 19, 1997

[30] Foreign Application Priority Data

Nov. 25, 1996 [JP] Japan .................................... 8-313791

[51] Int. Cl.[7] .................................................. H01J 7/24
[52] U.S. Cl. ................................ 313/36; 313/44; 348/749
[58] Field of Search ............................ 313/35, 44, 45, 313/36, 477 R; 348/749, 779, 781

[56] References Cited

U.S. PATENT DOCUMENTS

| | | | |
|---|---|---|---|
| 4,405,949 | 9/1983 | Hockenbroch et al. | 348/749 |
| 4,737,678 | 4/1988 | Hasegawa | 313/36 |
| 4,777,532 | 10/1988 | Hasegawa | 348/749 |
| 4,780,640 | 10/1988 | Hasegawa | 313/36 |
| 5,644,278 | 7/1997 | Takezawa | 313/36 |

FOREIGN PATENT DOCUMENTS 2 091 482  7/1982  United Kingdom ............ H01J 29/89

*Primary Examiner*—Michael H. Day
*Attorney, Agent, or Firm*—Rader, Fishman & Grauer; Ronald P. Kananen

[57] ABSTRACT

There can be avoided a contrast degradation caused by stray light generated from a liquid-cooling type cathode-ray tube apparatus incorporated in a projection type television apparatus. Stray light (7) emitted from a flange (peripheral edge) (11*a*) of a lens (11) out of a coupler (10) and the lens (11) disposed on the front face of a CRT 1 of a liquid-cooling type cathode-ray tube apparatus 5 is shield by light shielding members (ribs) (20), (20*a*) disposed in the coupler (10) and/or a lens plate (13).

6 Claims, 6 Drawing Sheets

LIQUID-COOLING TYPE CATHODE-RAY TUBE WITH LIGHT SHIELDING MEMBER

BACKGROUND OF THE INVENTION

1. Field of the Invention

The present invention relates to a liquid-cooling type cathode-ray tube apparatus to be used in a projection type television, and in particular to a liquid-cooling type cathode-ray tube apparatus in which stray light projected onto a screen is shielded.

2. Description of the Related Art

As for the color video projection system for projecting an enlarged image onto a large sized screen as a projection type television apparatus, various configurations have heretofore been proposed. Recently, a collective type projection television apparatus having a screen and a projector incorporated into a single cabinet is widely used. FIG. 1 shows a schematic diagram of such a projection type television apparatus 16, in which within a cabinet 2, a screen 3 is fitted to its upper front face, and on the upper rear face of the cabinet 2, a reflective mirror 4 is disposed in such a position as opposed to the screen 3.

A liquid-cooling type cathode-ray device 5 functioning as a projection tube is disposed so as to be opposed to the face of the reflective mirror 4. As for the projection type television apparatus 16, its size reduction has been attempted. As shown by one-dot chain line, therefore, the cabinet 2 has been lowered in height. As a result, the liquid-cooling type cathode-ray tube apparatus 5 has been disposed at an upper position.

Typically, a projected light 6 projected from the liquid-cooling type cathode-ray tube apparatus 5 is reflected by the reflective mirror 4 and made incident on the screen 3. Thus, a predetermined image is projected onto the screen 3. As a result, it is possible to see the projected picture in front of the screen 3.

The liquid-cooling type cathode-ray tube apparatus 5 used in the projection type television apparatus 16 described above is configured as shown in FIG. 2. In FIG. 2, a cooling liquid 9 for cooling the front face of a face panel 8 of a CRT 1 is contained in a coupler 10. The cooling liquid 9 is disposed between the face panel 8 and a lens 11. Although not illustrated, a pressure regulating valve for controlling the pressure of the cooling liquid 9 and a pressure regulating valve holder are disposed in the coupler 10. Reference numeral 12 denotes a sealing screw for sealing a cooling liquid pouring inlet 30 provided at an upper part of the coupler 10, and for maintaining air-tightness, the sealing screw 12 has a packing. Reference numeral 13 denotes a lens plate for supporting the lens 11. Reference numeral 14 denotes an O ring for maintaining the air tightness.

As shown in FIG. 3 which is an enlarged view of a portion A of FIG. 2, the lens 11 and the coupler 10 are sealed via the O ring 14 so as to be airtight. For the purpose of this sealing in air-tightness, the periphery of the lens plate 13 is pressed and attached to the coupler 10 by means of a screw 15.

According to the projection type television apparatus 16 having the above described configuration, the light emitted from the face panel 3 of the liquid-cooling type cathode-ray tube apparatus 5 housed in the cabinet 2 is emitted in the direction to the reflective mirror 4 via the cooling liquid 9 contained in the coupler 10 and the lens 11. However, the light subjected to diffused reflection in the coupler 10 is emitted as stray light 7 in the direction of a flange (peripheral edge) of the lens 11 as shown in FIG. 3, and irradiates a predetermined region 3a of the screen 3 as shown in FIG. 1. Therefore, the portion irradiated with the stray light becomes bright, resulting in degradation of the picture quality of the television apparatus.

SUMMARY OF THE INVENTION

In view of such aspects, it is an object of the present invention to provide a liquid-cooling type cathode-ray tube apparatus in which the picture quality degradation of a projection type television apparatus is prevented by shielding the stray light emitted from the outer peripheral edge of the lens fitted to the front face of the coupler provided on the CRT by using a light shielding member.

A liquid-cooling type cathode-ray tube apparatus having a cooling liquid poured into a coupler mounted between a face panel of a cathode-ray tube and a lens, includes a light shielding member for shielding stray light emitted via the lens, the light shielding member being disposed around an outer periphery of the lens of the coupler.

According to a liquid-cooling type cathode-ray tube apparatus of the present invention, it becomes possible to shield a stray light emitted from an outer peripheral edge of a lens. When the liquid-cooling type cathode-ray tube apparatus is incorporated into a projection type television apparatus resolution is not degraded by the unnecessary stray light.

DESCRIPTION OF THE PREFERRED EMBODIMENTS

An embodiment of the present invention will now be described by referring to FIGS. 4 through 6.

Figure 4:
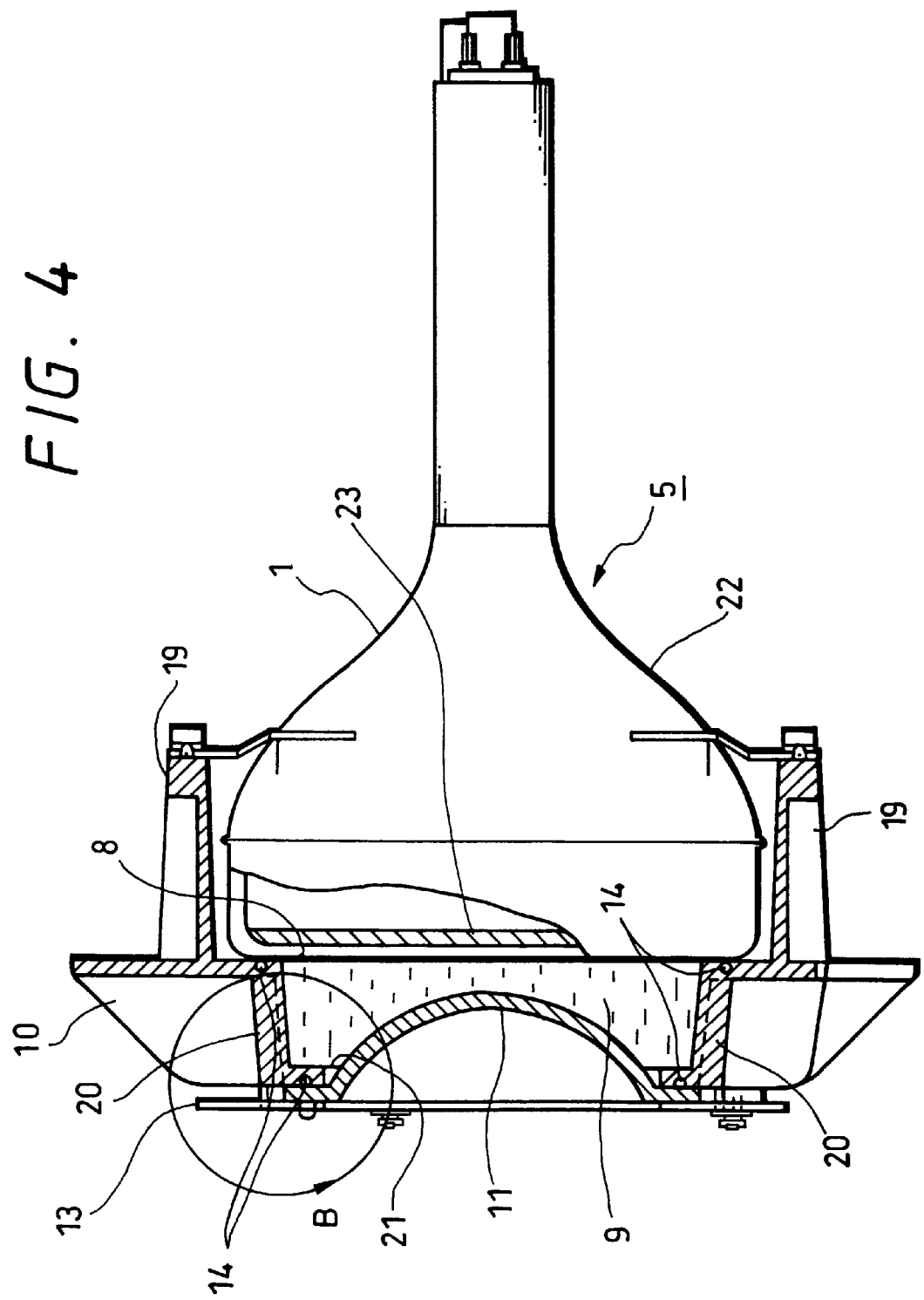
FIG. 4 is a side sectional view of a liquid-cooling type cathode-ray tube apparatus according to the present invention.

FIG. 4 is a side sectional view of a liquid-cooling type cathode-ray tube according to the present invention. FIG. 5 is a front view of FIG. 4. FIG. 6 is an enlarged view of a portion B of FIG. 4.

Figure 5:
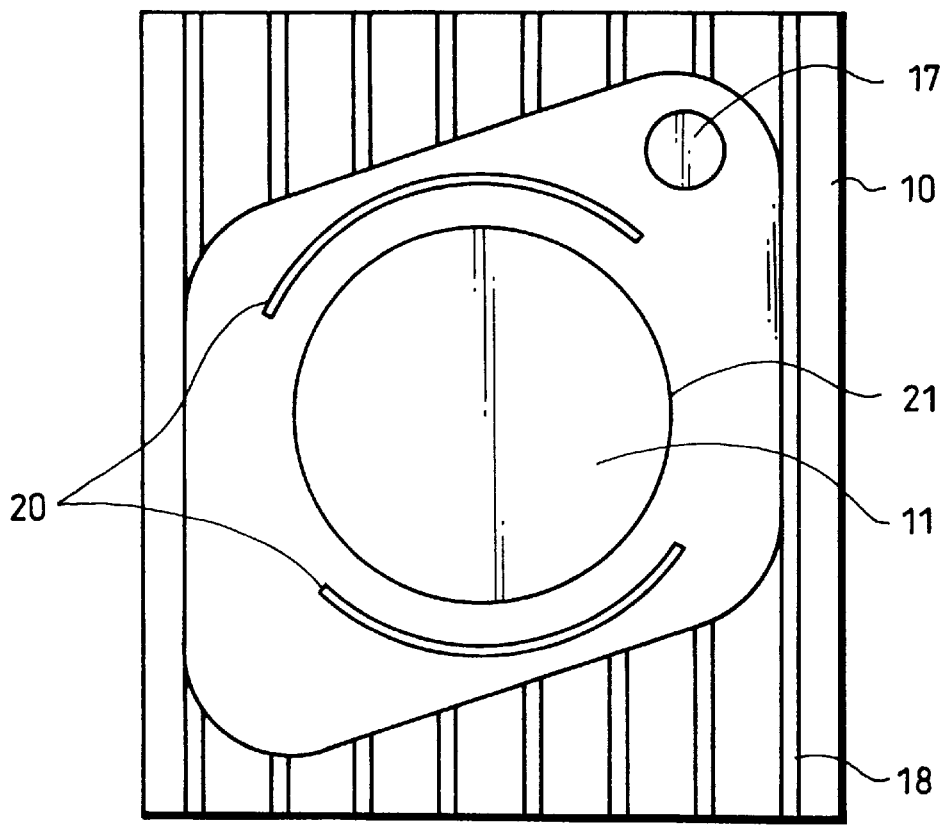
FIG. 5 is a front view of the liquid-cooling type cathode-ray tube apparatus according to the present invention.

With reference to FIGS. 4 and 5, the whole configuration of a liquid-cooling type cathode-ray tube apparatus 5 of the present example used in a projection type television apparatus 16 will be described. As for each of CRTS of three tubes for R, G and B used in the projection type television apparatus 16, a fluorescent substance of R, G or B is formed on the entire internal face of a face panel 8 by using a deposition method or the like to form a fluorescent screen 23. A brightness value equivalent to more than 20 times of that of the ordinary color cathode-ray tube is needed, and more than 90% of the input power is converted to thermal energy. Therefore, a heat radiation structure withstanding a high load is needed.

Figure 2:
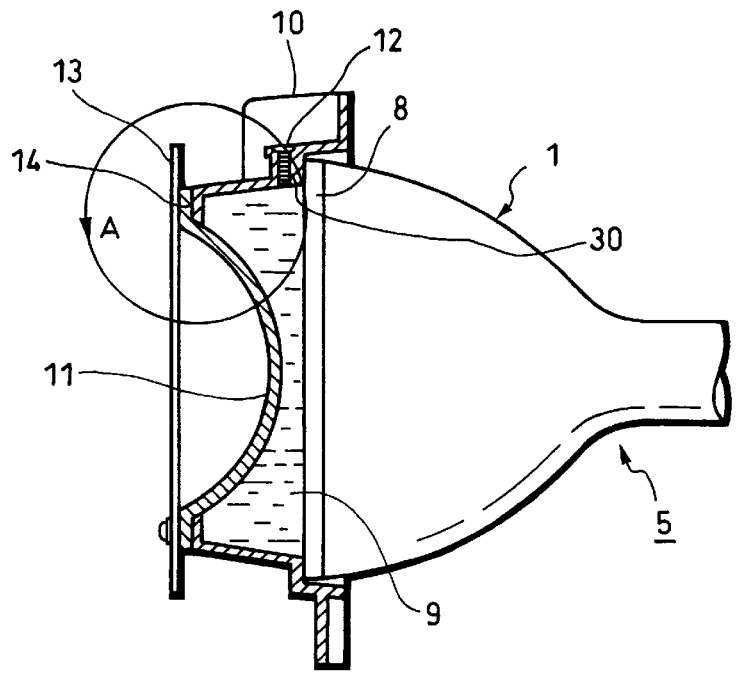
FIG. 2 is a side sectional view of a liquid-cooling type cathode-ray tube apparatus shown in FIG. 1.
Figure 3:
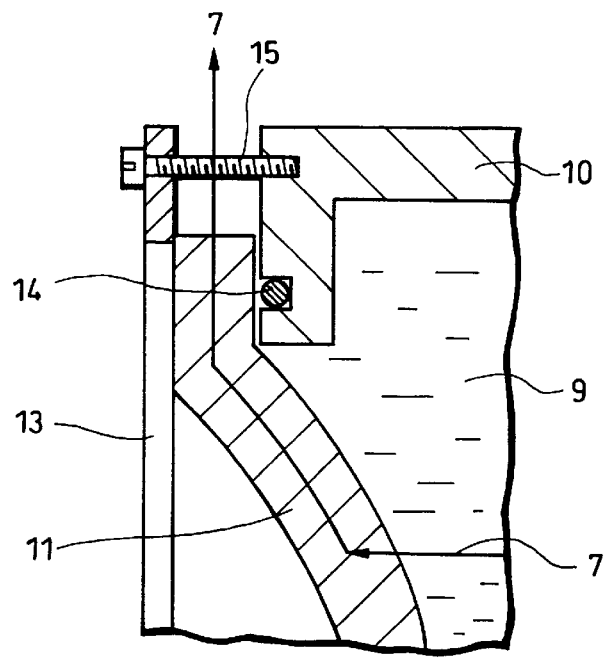
FIG. 3 is an enlarged view of a portion A shown in FIG. 2.

For this reason, various configurations having heat radiation structures have been proposed. In the case of FIGS. 4 and 2, a coupler 10 is disposed on the front face of the face panel 5 of a CRT 1 and a cooling liquid 9 poured into the coupler 10 comes into contact with the front face of the face panel 8 to cool the heat energy generated from the fluorescent substance 23. As the cooling liquid 9, an 80% ethyleneglycol water solution is used.

When seen from the front side, the coupler 10 is formed so as to nearly have a rectangular shape as shown in FIG. 5. Nearly at its central part, a through hole 21 is bored. For airtight sealing, a lens 11 formed so as to be concave is fitted to the through hole 21 via an O ring 14. The lens 11 is screwed and fixed to the coupler 10 via a lens plate 13. On the front face side of the coupler 10, a number of cooling fins 18 are formed in parallel to one another in order to increase the heat radiation effect. On the back part of the coupler 10, a fixture member 19 is extended and gripped between a funnel portion 22 of the CRT 1 and the face panel 8 thereof.

The joint faces between the face panel 8 of the CRT 1 and the coupler 10 are sealed via the O ring 14 so as to be airtight. Through the front face of the coupler 10, a diaphragm mounting opening is bored, and a pressure regulating valve (hereafter referred to as a diaphragm) 17 is disposed therein. This diaphragm 17 is a regulating valve for automatically regulating the pressure when the cooling liquid 9 is heated and expanded.

Figure 1:
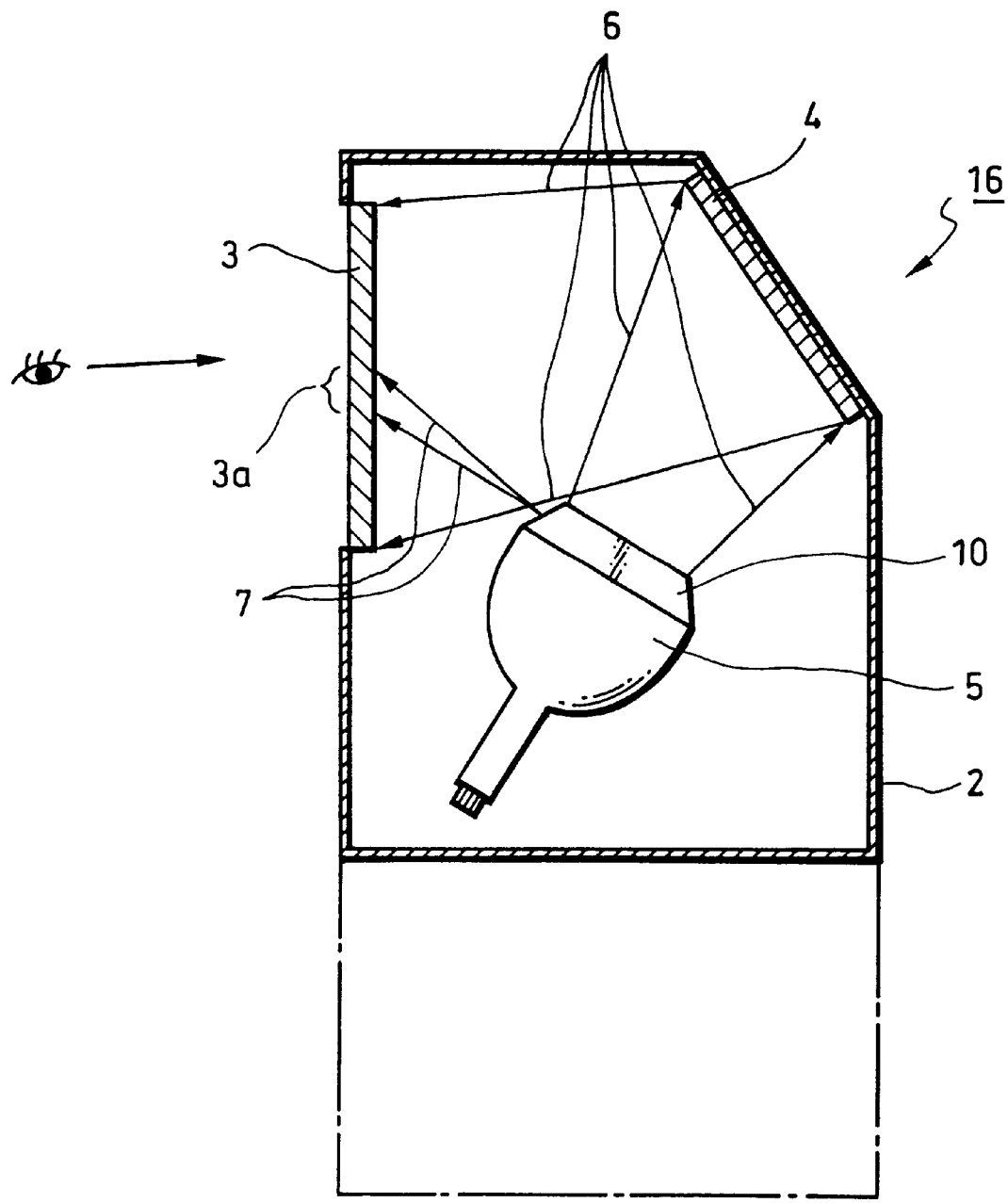
FIG. 1 is a schematic diagram of a projection television apparatus.
Figure 6:
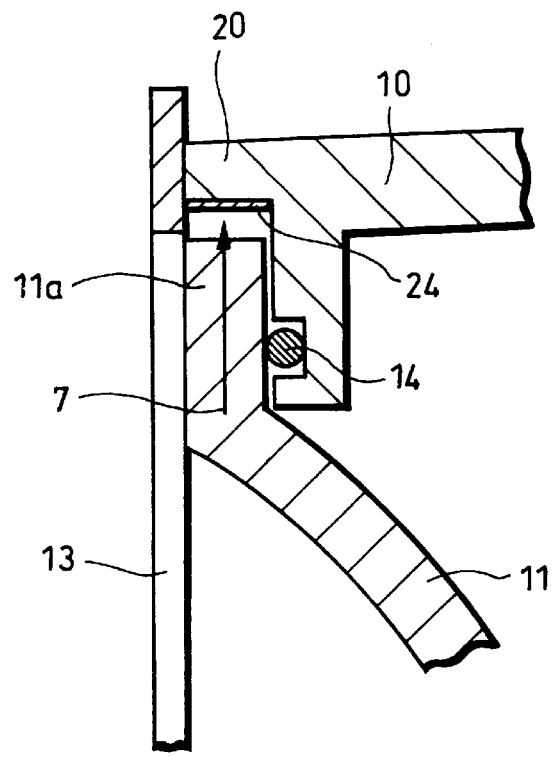
FIG. 6 is an enlarged view of a portion B shown FIG. 4.

As shown in FIG. 6 showing the enlarged view of the portion B of FIG. 4 and FIG. 5 showing the front view of FIG. 4, ribs 20 which are light shielding members for shielding the stray light 7 emitted from a peripheral edge 11a forming the flange of the lens 11 in the direction to the screen 3 in FIG. 1 are formed between the front face of the coupler 10 and the lens plate 13 of the present example so as to become nearly semi-circular and extend nearly by the thickness of the peripheral edge 11a of the lens 11. As occasion demands, a black paint or the like, for example, may be coated on the internal faces of the ribs 20 as a light absorbing material 24. Although not illustrated in FIG. 6, when the lens plate 13 is fixed to the coupler 10 via the O ring 14 by screws 15, the back surface of the lens plate 13 is adhered closely to the contact surface of the rib 20 so as to prevent the stray light 7 from leaking.

Figure 7:
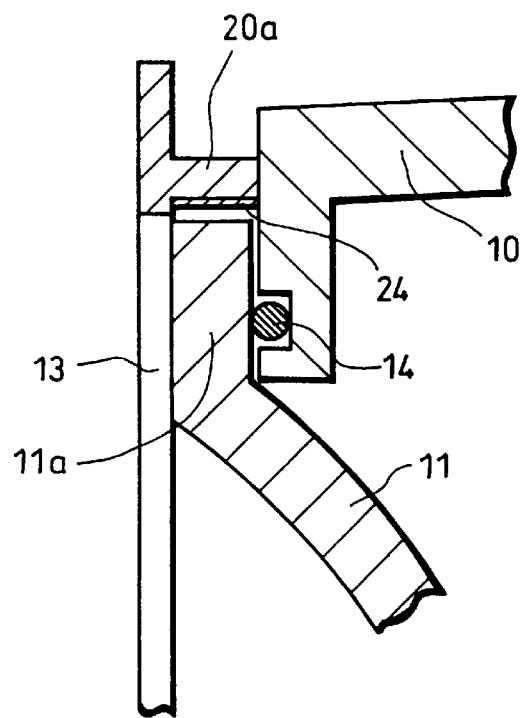
FIG. 7 is an enlarged view showing another configuration according to the present invention.

In FIGS. 5 and 6, the rib 20 serving as the light shielding member is extended to the front face side of the coupler 10. In FIG. 7 showing another configuration of the enlarged view of the portion B of FIG. 4, a rib 20a serving as the semi-circular light shielding member is extended from the back portion of the lens plate 13 by the thickness of the peripheral edge 11a of the lens 11, and the light absorbing material 24 is coated on the inner face of the rib 20a.

Figure 8A:
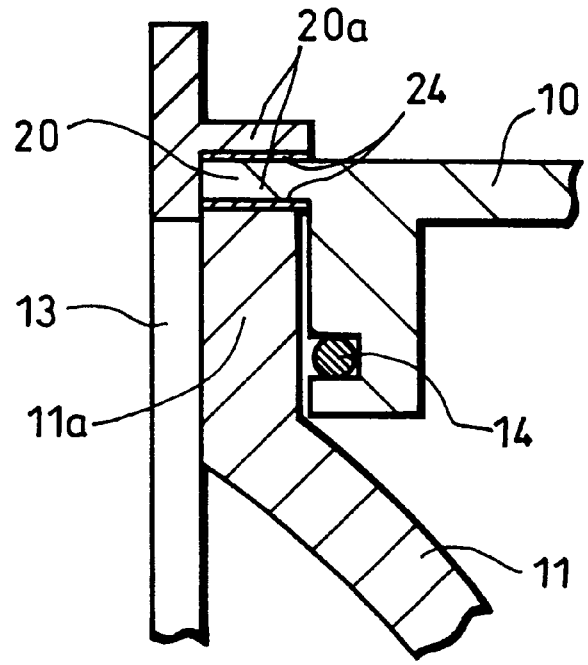
FIGS. 8A and 8B are enlarged views each showing still another configuration according to the present invention.

FIG. 8A is a combination of configurations shown in FIGS. 6 and 7. The rib 20 extended from the side of the coupler 10 and the rib 20a extended from the side of the lens plate 13 are disposed alternately above the upper portion of the flange (peripheral edge) of the lens 11 in a semi-circular form in order to further enhance the light shielding effect for the stray light 7.

Figure 8B:
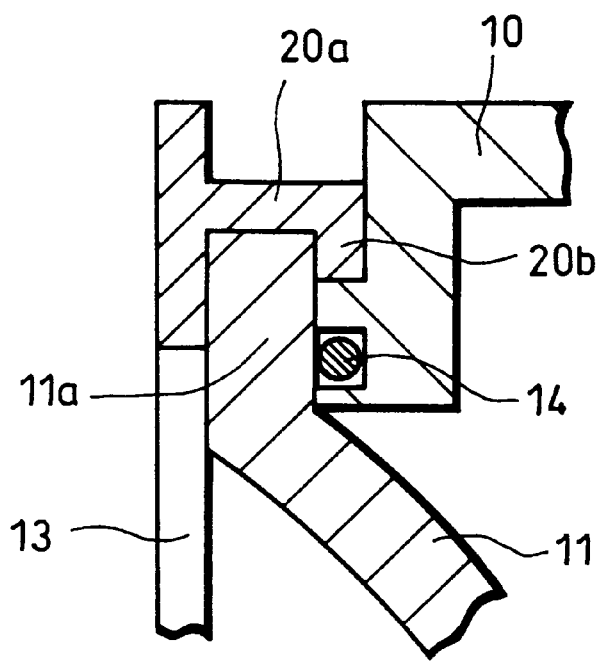

In the configuration shown in FIG. 8B, the rib 20 or 20a is folded inside so as to cover the flange (peripheral edge) of the lens 11 to thereby form an inwardly folded portion 20b. Thus, it surrounds the peripheral edge and the outer peripheral edge in a semi-circular form, resulting in further increasing the light shielding effect.

According to the present invention, since the ribs serving as the light shielding members extended at the front portion of the coupler 10 are disposed in the liquid-cooling type cathode-ray tube as described above, it becomes possible to prevent the picture quality degradation caused by the stray light emitted from the peripheral edge of the lens and projected onto the screen with a simple configuration to form the rib.

In the liquid-cooling type cathode-ray tube apparatus according to the present invention, it becomes possible to avoid the light leakage by such a simple configuration that only the ribs for shielding the stray light emitted from the peripheral edge of the flange of the lens are formed on the coupler and/or lens guide. As a result, it becomes possible to improve the contrast and the resolution of projection type television apparatuses.

Having described preferred embodiments of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A liquid-cooling type cathode-ray tube apparatus having a cooling liquid poured into a coupler mounted between a face panel of a cathode-ray tube and a lens, comprising:

a light shielding member for shielding stray light emitted via said lens, said light shielding member being formed of a rib provided on a lens plate releasably affixed to said coupler, said shielding member abutting said coupler and being disposed around an outer periphery of said lens.

2. A liquid-cooled cathode-ray tube, comprising:

a face panel;

a lens unit having a flange extending from a peripheral edge of said lens unit;

a coupler unit mounted between said face panel and said peripheral edge of said lens unit, said coupler unit containing a liquid therein; and a lens plate releasably affixed to said coupler unit, said lens plate abutting said coupler unit and having a first opaque portion disposed around an outer periphery of said flange.

3. A liquid-cooled cathode-ray tube according to claim 2, further comprising:

a second opaque portion extending from said coupler unit and being disposed around an outer periphery of said flange.

4. A liquid-cooled cathode-ray tube according to claim 2, further comprising:

an appendage extending from said first opaque portion, said appendage being positioned between said flange and said coupler unit.

5. A liquid-cooled cathode-ray tube according to claim 3, wherein said first and second opaque portions are coated with a light absorbing material.

6. A liquid-cooled cathode-ray tube according to any one of claims 2 through 5, further comprising a liquid seal positioned between said coupler and said lens unit.

* * * * *